(12) United States Patent
Shimizu et al.

(10) Patent No.: US 7,448,580 B2
(45) Date of Patent: Nov. 11, 2008

(54) THIN-TYPE DISPLAY DEVICE (75) Inventors: Masaki Shimizu, Tochigi (JP); Takashi Yoshii, Chiba (JP)

(73) Assignee: Sharp Kabushiki Kaisha, Osaka (KP)

( * ) Notice: Subject to any disclaimer, the term of this patent is extended or adjusted under 35 U.S.C. 154(b) by 214 days.

(21) Appl. No.: 10/506,009

(22) PCT Filed: Aug. 8, 2003

(86) PCT No.: PCT/JP03/10193

§ 371 (c)(1),
(2), (4) Date: Aug. 30, 2004

(87) PCT Pub. No.: WO2004/019308

PCT Pub. Date: Mar. 4, 2004

(65) Prior Publication Data

US 2005/0205731 A1    Sep. 22, 2005

(30) Foreign Application Priority Data

Aug. 22, 2002 (JP) ............................. 2002-241571

(51) Int. Cl.
*F16M 11/04* (2006.01)
(52) U.S. Cl. .................... 248/176.3; 248/676; 248/920; 361/681
(58) Field of Classification Search ............. 248/176.3, 248/919–924, 652, 655, 658, 659, 662, 665, 248/667, 676, 474, 478, 480, 176.1, 222.51, 248/222.52, 292.12, 292.14; 361/681, 682
See application file for complete search history.

(56) References Cited

U.S. PATENT DOCUMENTS

| | | | | |
|---|---|---|---|---|
| 4,494,720 A | * | 1/1985 | Gregory et al. ............. | 248/371 |
| 4,533,105 A | * | 8/1985 | Cornwell et al. ............ | 248/371 |
| 4,562,988 A | * | 1/1986 | Bumgardner ............ | 248/181.1 |
| 4,621,782 A | * | 11/1986 | Carlson et al. ........... | 248/183.3 |
| 4,706,920 A | * | 11/1987 | Ojima et al. ................ | 248/371 |
| 4,858,864 A | * | 8/1989 | Thompson ............... | 248/176.3 |
| 5,520,361 A | * | 5/1996 | Lee ............................ | 248/398 |
| 5,629,833 A | | 5/1997 | Ido et al. | |
| 5,704,581 A | * | 1/1998 | Chen .......................... | 248/371 |

(Continued)

FOREIGN PATENT DOCUMENTS

CN      1118130 A      3/1996

(Continued)

*Primary Examiner*—Korie H. Chan
(74) *Attorney, Agent, or Firm*—Birch, Stewart, Kolasch & Birch, LLP (57) ABSTRACT A flat panel display apparatus is provided which is capable of conducting a transition of a display unit between the landscape and portrait orientation at one step and rotating around the substantial central portion of said display unit. The flat panel display apparatus includes a thin flat display unit having a rectangular display screen thereon; a stand unit for supporting said display unit; and a horizontal rotary pin which is secured to the display unit on its rear side in the substantial center thereof and which holds said display unit so that display unit is rotatable by at least 90° relative to the stand unit and is characterized in that said display apparatus is provided with translational motion means which causes the translational motion of said display unit in a vertical direction in an interlocking manner with the rotation of said horizontal rotary pin secured to the display unit.

36 Claims, 11 Drawing Sheets

U.S. PATENT DOCUMENTS 6,189,850 B1 2/2001 Liao et al.

FOREIGN PATENT DOCUMENTS

| | | |
|---|---|---|
| EP | 0989479 A1 | 3/2000 |
| JP | 8-185243 A | 7/1996 |
| JP | 9-128098 A | 5/1997 |
| JP | 11-24577 A | 1/1999 |
| JP | 11-338363 A | 12/1999 |

* cited by examiner

THIN-TYPE DISPLAY DEVICE

FIELD OF THE INVENTION

The present invention relates to a flat panel display apparatus such as liquid crystal display apparatus and in particular to a flat panel display apparatus having a display screen which is tiltable into landscape (horizontal) orientation or portrait (vertical) orientation.

BACKGROUND OF THE INVENTION

Various mechanisms which change the display screen of the flat panel display apparatus such as liquid crystal display apparatus to be tilted into a landscape (horizontal) orientation or portrait (vertical) orientation have heretofore been proposed. A screen orientation changing mechanism of a simple structure which conducts a combination of an operation for turning a display unit with an operation for moving the display unit in a vertical direction without using separate turning mechanism and vertical moving mechanism is disclosed in, for example, JP-A-Hei 11-338363.

In this mechanism, a bar like connecting member which is referred to as "link bar" is disposed between the display unit and a stand. The link bar is mounted at its upper end (rotary axis A) on the stand so that it is rotatable and its rotation angle can be kept. The link bar is mounted at its lower end (rotary axis B) on the display unit in a position offset from the center of the screen of the display unit, so that it is rotatable and its rotation angle can be kept. The display screen can be changed from a landscape (horizontal) orientation to a portrait (vertical) orientation by initially turning the display unit by an angle around the rotary axis B and then turning the display unit around the rotary axis A by an angle â.

However, the changing operation between the landscape and portrait orientation is not completed at one step in the screen orientation changing mechanism of the above-mentioned prior art flat panel display apparatus since it is conducted at two steps of rotary movements by the rotary axes A and B. Specifically if the changing mechanism is applied to large screen display apparatus, an extended period of time and labor is expended. Since the rotation center is not in the vicinity of the center of the screen, the rotary movement of the display unit at this time is larger than that around the central portion of the display unit, so that ease of rotation may be lost. As a result, a process for changing the orientation of the display screen may become very unstable.

The present invention was made in view of the above-mentioned problem. It is therefore, an object of the present invention to provide a flat panel display apparatus which is capable of conducting a transition between the landscape and portrait orientation of the display unit at one step and capable of turning the display unit around the substantial center of the display unit.

SUMMARY OF THE INVENTION

The present invention relates to a flat panel display apparatus including a thin flat display unit having a rectangular display screen thereon; a stand unit for supporting said display unit; and a horizontal rotary pin on a horizontal rotational axis which is secured to said display unit on the center of its rear side and which holds said display unit so that display unit is rotatable by at least 90° relative to said stand unit, wherein said display apparatus is provided with translational motion means which causes the translational motion of said display unit in a vertical direction in an interlocking manner with the rotation of said display unit about said horizontal rotary axis.

In the present invention, said translational motion means is provided on said stand unit.

In the present invention, said translational motion means comprises a vertical lifting slide for moving along a vertical axis, on which said horizontal rotary pin is rotatably mounted and which is movable in a vertical upward or downward direction, and a cam portion which abuts said vertical lifting slide and is interlocked with the rotation of said horizontal rotary pin so that it is rotated in response to rotation of that rotary pin together with said display unit about the horizontal rotary axis defined by said pin.

In the present invention, said vertical lifting slide is provided with a guide for guiding the rotation of said cam portion.

In the present invention, said stand unit is provided with a guide for guiding the rotation of said cam portion.

In the present invention, said stand unit is provided with a rotation restriction portion which abuts on a part of said cam portion or said rotary pin for restricting the range of the rotation of said rotary pin on said horizontal rotary axis.

In the present invention in various embodiments, said stand unit is provided with biasing means for biasing said vertical lifting slide in a vertical upward or downward direction to apply a load upon the rotation of said display unit.

In the present invention, said translational motion means comprises a cam portion which abuts on said stand unit in such a manner that said cam portion is movable in a vertical direction and is interlocked with said horizontal rotary pin on said horizontal rotary axis.

In the present invention, in another embodiment, said translational motion means comprises at least one projection from the rotary pin, which is provided on the rear side of said display unit, a vertically movable vertical lifting slide on which said rotary pin is rotatably mounted, and a rail which is provided on said stand unit for controlling the vertical movement of said vertical lifting slide by guiding the trajectory of said projection which is caused by the rotation of said display unit on said rotary pin.

In the present invention, said rail has substantially rectilinear shape or upwardly convex shape.

In the present invention, said rail is provided on its inner periphery with a series of detents, appearing as a corrugated portion in side elevation which is engaged by said projection.

In the present invention, said projection comprises a roller which can be rolled on and along the inner face of said rail while said roller abuts thereon.

In the present invention, cooperating concave and convex boss structures preventing said projection from escaping from said rail are provided on the inner periphery of said rail and the outer periphery of said projection, respectively.

In the present invention, in this embodiment, a fabric material for suppressing the wearing of said rail and said projection is applied on the inner periphery of said rail and the outer periphery of said projection, respectively.

In the present invention, in this embodiment, said stand unit is provided with biasing means for preventing said vertical lifting slide from abruptly moving in a vertical direction.

In the present invention, in this embodiment, said rail or said projection is provided with biasing means for mitigating the shock due to abrupt rotation of said projection.

DETAILED DESCRIPTION OF THE INVENTION

First Embodiment

Figure 1A:
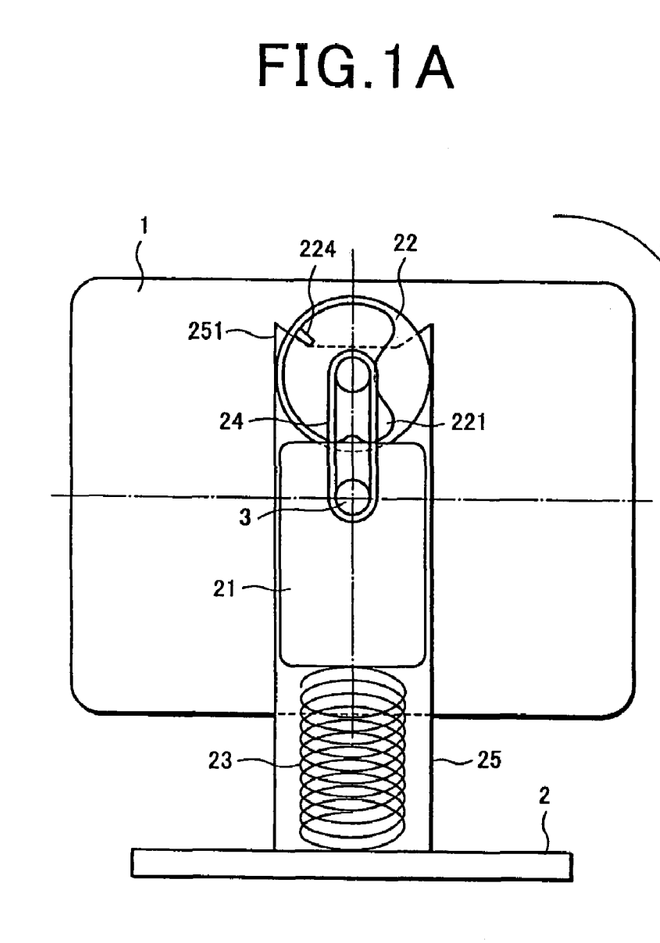
FIGS. 1A and 1B show the first embodiment of the flat panel display apparatus of the present invention and are rear sectional views showing the landscape and portrait screen orientation, respectively.
Figure 1B:
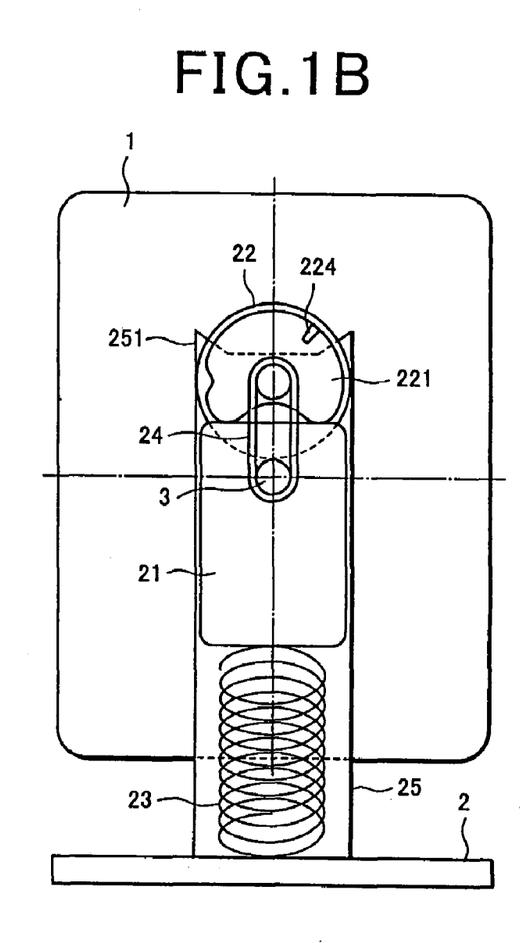
Figure 2A:
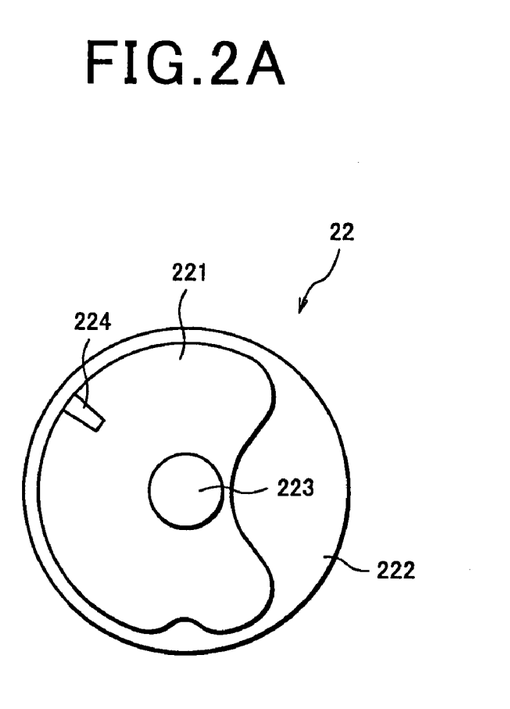
FIGS. 2A and 2B show the cam portion in the first embodiment of the present invention and are front and elevational views, respectively.
Figure 2B:
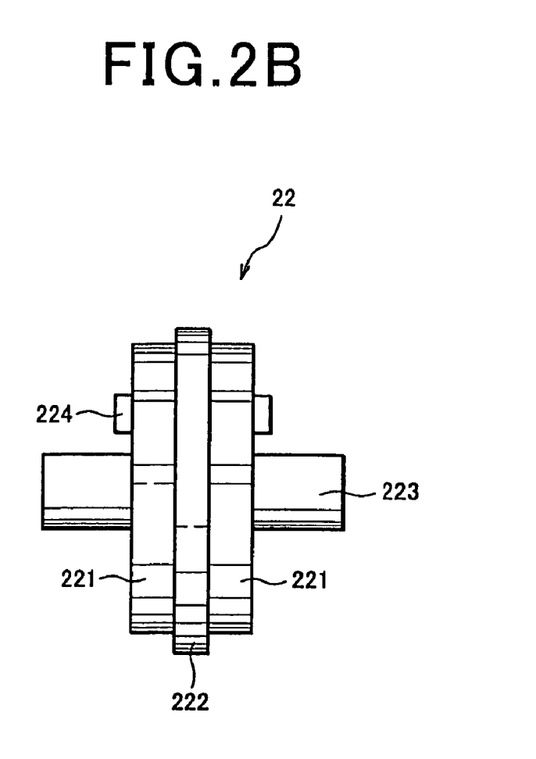
Figure 3A:
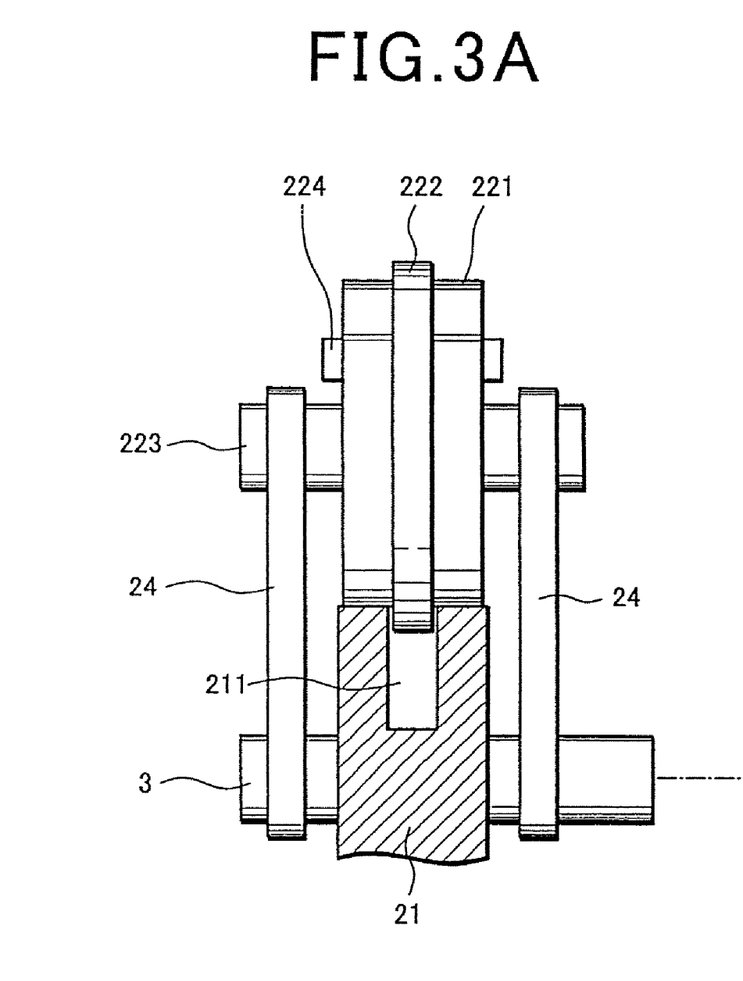
FIGS. 3A and 3B show the main part of the first embodiment of the present invention and are main part elevational sectional views showing the landscape and portrait screen orientation, respectively.
Figure 3B:
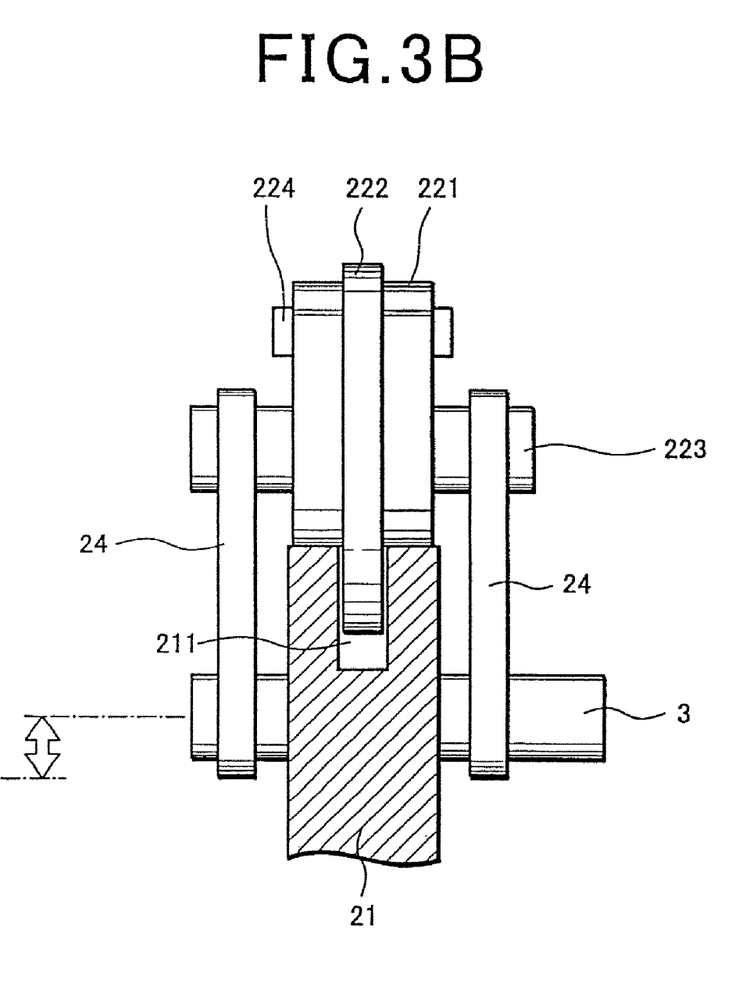

Now, a first embodiment of the flat panel display apparatus of the present invention will be described in detail with reference to FIGS. 1A through 3B. FIGS. 1A and 1B show a first embodiment of a flat display apparatus of the present invention. FIGS. 1A and 1B are rear sectional views showing the landscape (horizontal) and portrait (vertical) orientation, respectively. FIGS. 2A and 2B are views showing a cam portion in the flat panel display apparatus of the present embodiment. FIGS. 2A and 2B are front and elevational views, respectively. FIGS. 3A and 3B are elevational sectional views of a main part showing the landscape and portrait screen orientation, respectively.

As shown in FIGS. 1A and 1B, the flat panel display apparatus of the present embodiment comprises a flat panel display unit 1 having a substantially rectangular display screen, a stand unit 2 which supports the display unit 1, and a horizontal rotary pin 3 which is secured to said display unit 1 on its rear side in the substantial center thereof and which holds the display unit 1 so that it can be rotated with and on the horizontal axis of the rotary pin 3 with respect to the stand unit 2 by at least 90°.

The stand unit 2 is provided with a translational motion means which causes the translational motion of the display unit 1 in a vertical direction in association with the rotation of the horizontal rotary pin 3 and comprises a vertical lifting slide 21 which is movable in a vertical direction and on which the horizontal rotary pin 3 is rotatably mounted, a cam portion 22 which abuts the upper end face of the vertical lifting slide 21 and is rotated in association with the rotation of the horizontal rotary pin 3 (and display unit 1), a biasing means 23 such as a spring or the like which biases the lower end face of the vertical lifting slide 21 upwards (toward the cam portion 22), and an interlocking drive portion 24 which rotates the cam portion 22 in an interlocking manner with the rotation of the horizontal rotary pin 3 and display unit 1.

The vertical lifting slide 21, cam portion 22 and biasing means 23 are accommodated in an outer shell 25 of the stand unit 2. The horizontal rotary pin 3 is interlocked with the rotary motion of the display unit 1 while it is freely rotatable with respect to the vertical lifting slide 21. The rotation of the cam portion 22 is interlocked with the rotation of the horizontal rotary pin 3 via the interlocking drive portion 24.

In the foregoing structure, the cam portion 22 is provided with an abuttable portion 221 which abuts the upper end face of the vertical lifting slide 21, a convex guide portion 222 which is provided on the outer peripheral face thereof, and a horizontal rotary axle 223 which is interlocked with the horizontal rotary pin 3 via the interlocking portion 24 as shown in FIGS. 2A and 2B. The rotary axle 223 is rotatably mounted on the outer shell 25 of the stand unit, so that the relative position between the rotary axle 223 and the outer shell 25 of the stand unit is not changed.

The abuttable portion 221 is in such a form that the position in which it abuts the vertical lifting slide 21 is vertically changed against the bias of the biasing spring 23 depending upon the angular position of the cam portion 22. Accordingly, the rotation angle of the display unit 1 causes the vertical lifting slide 21 to be moved vertically. On the other hand, the convex guide portion 222 on the outer peripheral face of the cam portion 22 is engaged with the concave guide slot 211 in the upper end face of the vertical lifting slide 21 to suppress lateral offset between the horizontal rotary pin 3 and the rotary axle 223 of the cam portion 22 as shown in FIGS. 3A and 3B. This achieves the guide function which enables a series of rotary motions to be smoothly conducted. Also as shown, there are two interlocking drive portions or belts 24, one on each side of the cam portion 22 and vertical slide 21.

In order to achieve this guide function, it is possible to properly reverse the concave and convex relationship between the cam portion 22 and the vertical lifting slide 21. In order to stably guide the rotation of the cam portion 22, a concave guide slot with which the convex guide portion 222 on the outer peripheral face of the cam portion 22 engages may be provided on, for example, the side of the outer shell 25. In this case, it is needless to say that the concave and convex relationship may be properly reversed.

The interlocking portion 24 plays a role to interlock the rotary movement of the horizontal rotary pin 3 with that of the cam portion 221. The interlocking portion 24 is made of, for example, an elastomer material to constrain both axes so that no slack of the interlocking portion is caused by vertical displacement of the vertical lifting slide 21 and hence, a change in the vertical separation of the horizontal rotary pin 3 and axle 223.

The biasing means 23 is disposed at least on the lower or upper side of the vertical lifting slide 21. The biasing means 23 can impose an appropriate load upon the rotary movement of said display unit 1 and eliminate vertical play in the stand unit 2.

The stability of the elevational position of the vertical lifting slide 21 can be enhanced by keeping a balance between the depressing force which is applied upon the vertical lifting slide 21 by the abuttable portion 221 of the cam portion 22 and strains which are applied on members due to the gravity on the vertical lifting slide 21. If the biasing means 23 is disposed on the upper side of the vertical lifting slide 21, it is expected that the biasing means 23 plays a role to prevent the display unit 1 from colliding with the outer shell 25 and the like when the display unit 1 is lifted up.

The cam portion 22 is provided with an engaging piece 224 to prevent the display unit 1 from turning through an angular angle larger than necessary. Turning of the display unit through an angle more than a necessary angle can be suppressed by the engagement of the engagement piece 224 with a turning restriction detent or edge portion 251 of the stand unit 2 at a given position angle of the cam portion 22. The engagement piece 224 may be provided in any position if it is positioned between the rotary member (display unit 1, horizontal rotary pin 3 and the like) and a member which conducts no rotary movement (vertical lifting slide 21, outer shell 25 and the like). This prevents excessive rotation of the cam portion 22 in relation to these non-rotatable components.

Since the flat panel display apparatus of the present embodiment is configured as mentioned above, when the display unit 1 is switched from the landscape orientation in which the display screen is horizontally orientated as shown in FIG. 1A to the portrait orientation in which it is vertically orientated as shown in FIG. 1B, turning of the display unit 1 in a direction represented by an arrow A causes the horizontal rotary pin 3 secured on the center of the rear side of the display unit 1 to rotate, so that the cam portion 22 which is linked with the horizontal rotary pin 3 via the interlocking portion 24 is also rotated in an interlocking manner therewith.

Rotation of the cam portion 22 causes the vertical lifting slide 21 to be lifted or lowered depending upon the cam contour of the abuttable portion 221. Since this causes the horizontal rotary pin 3 on the vertical lifting slide 21 to be moved vertically, the display unit 1 to which the horizontal rotary pin 3 is secured can conduct the rotary movement so that it is not in contact with the floor on which the stand unit is placed while the screen orientation is changed and so that the elevation of the lower end face of the display unit before and after the change of the screen orientation is substantially the same.

As mentioned above, the flat panel display apparatus of the present embodiment is capable of changing the display unit 1 from the landscape orientation to the portrait orientation and vice versa around the substantial central portion of the display unit 1 in one step. Therefore, stable turning operation of the display unit 1 can be achieved without being influenced adversely by gravity.

Second Embodiment

Figure 4A:
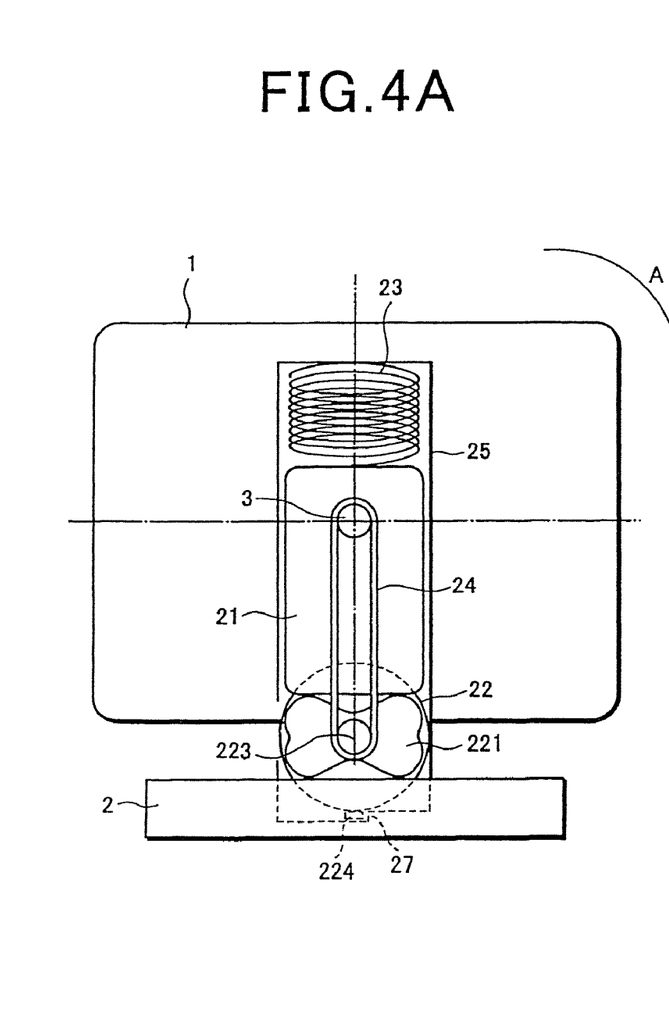
FIGS. 4A and 4B show the second embodiment of the present invention and are rear sectional views showing the landscape and portrait screen orientation, respectively.
Figure 4B:
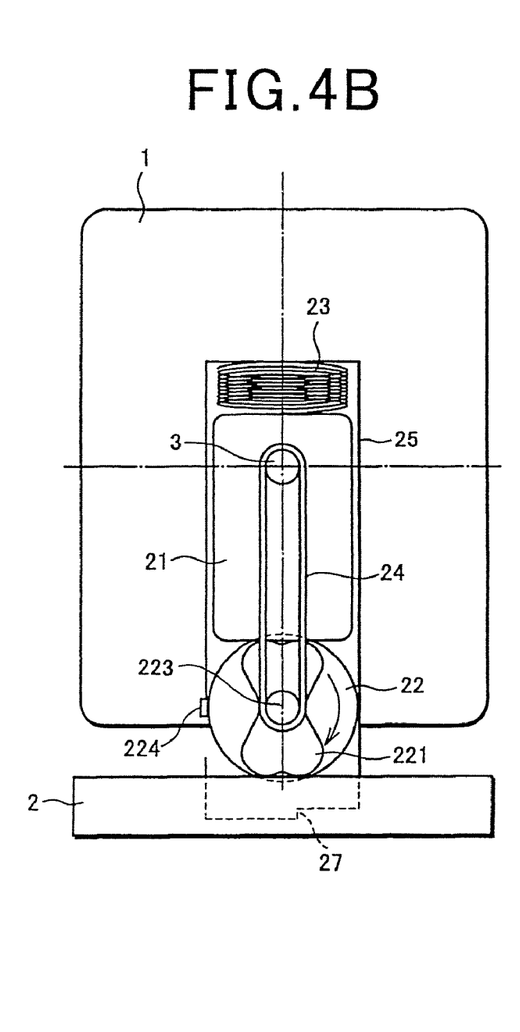
Figure 5A:
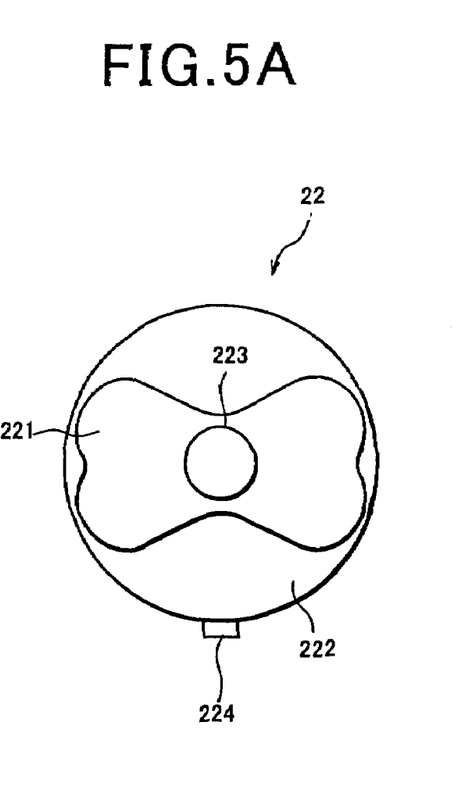
FIGS. 5A and 5B show the cam portion in the second embodiment of the present invention and are front and elevational views, respectively.
Figure 5B:
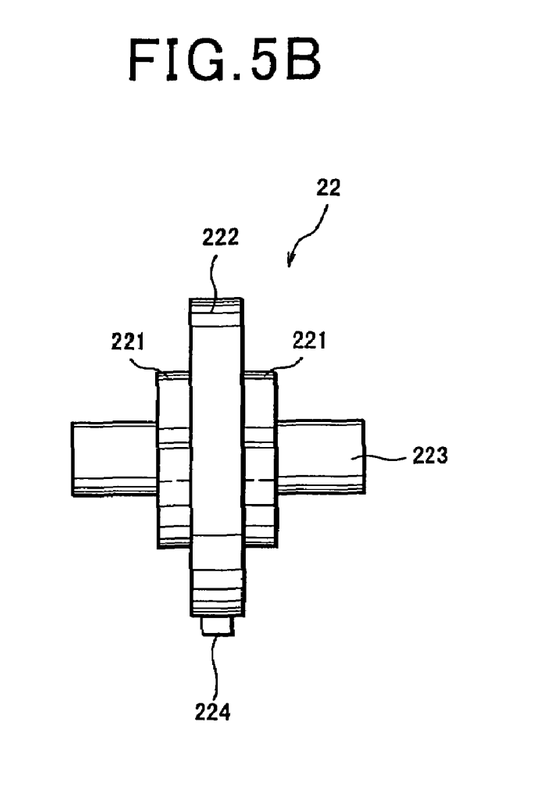
Figure 6A:
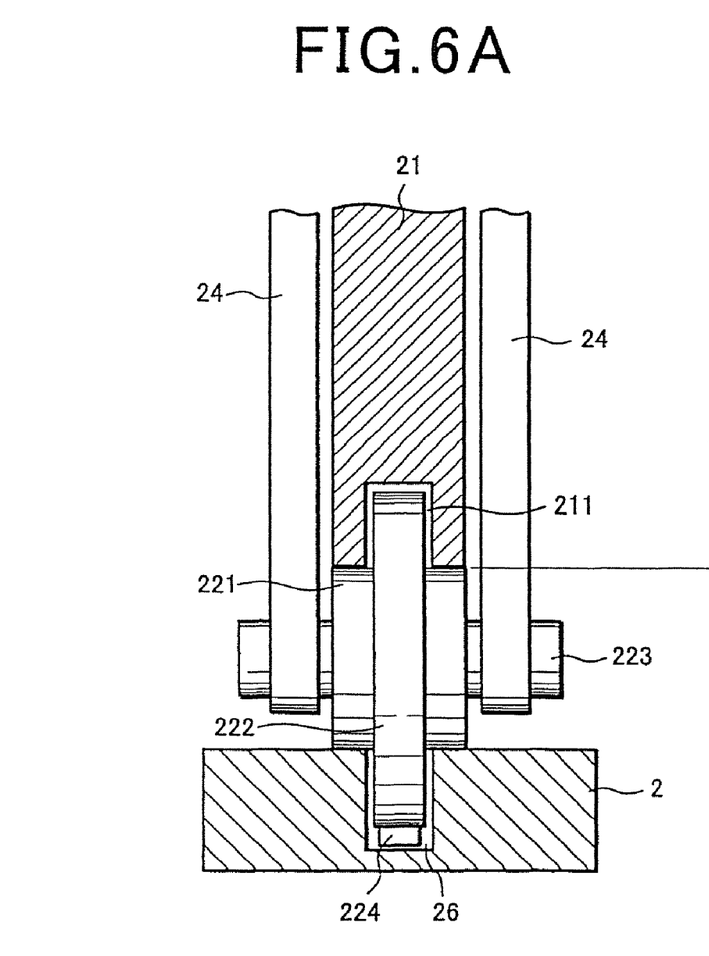
FIGS. 6A and 6B show the main part of the second embodiment of the present invention and are main part elevational sectional views showing the landscape and portrait screen orientation, respectively.
Figure 6B:
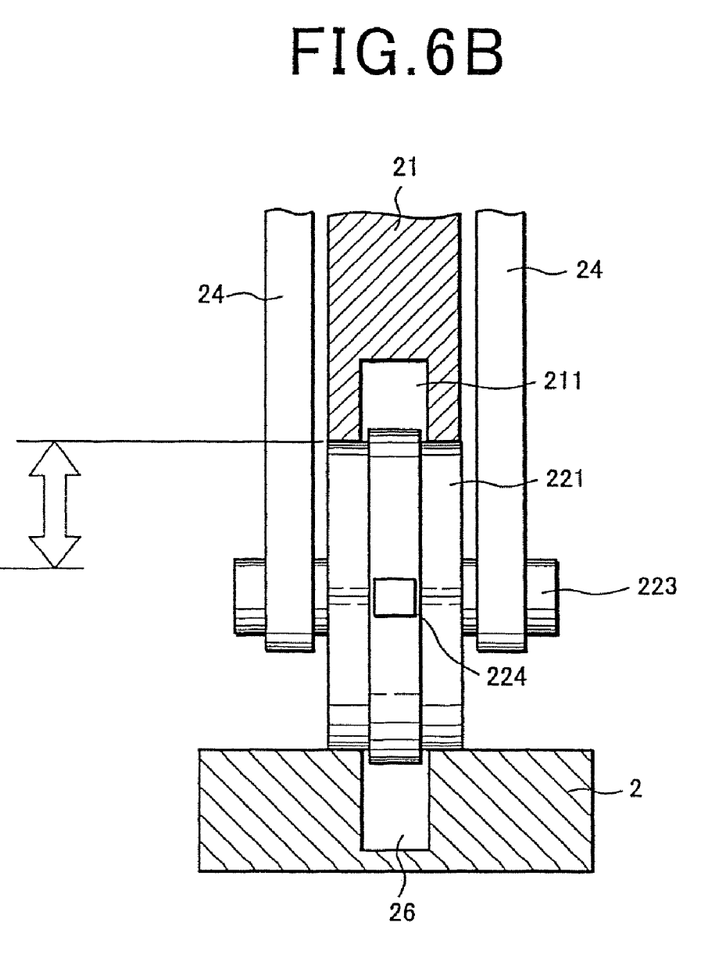

Now, a second embodiment of the flat panel display apparatus of the present invention will be described in detail with reference to FIGS. 4A through 6B. Like components are designated by like reference numerals in FIG. 1. The description of them will be omitted. FIGS. 4A and 4B show the second embodiment of the flat panel display apparatus of the present invention. FIGS. 4A and 4B are rear sectional views showing the landscape and portrait orientation, respectively. FIGS. 5A and 5B are front and elevational views, respectively, showing the cam portion in the flat panel display apparatus of the present embodiment. FIGS. 6A and 6B show a main part of the flat panel display apparatus of the present embodiment. FIGS. 6A and 6B are elevational sectional views of a main part showing the landscape and portrait orientation, respectively.

The flat panel display apparatus of the present embodiment comprises a biasing means 23 (compression spring or the like), vertical lifting slide 21 and cam portion 22, which are disposed in an outer shell 25 of a stand unit 2 in that order from the top thereof as shown in FIGS. 4A and 4B. The second embodiment has an arrangement of components which is a reversal of that of the first embodiment which has been described with reference to FIGS. 1A and 1B. Similarly to the foregoing first embodiment, the horizontal rotary pin 3 is interlocked with the rotary axle 223 of the cam portion 22 by an interlocking portion 24, so that they are rotated together.

The description of the first embodiment may be substantially identical with that of the various functions of the cam portion 22 except that the rotary axle 223 is mounted on the outer shell 25, so that it is movable in a vertical direction. Provision of two abutments of the abuttable portion 221, one with each of the vertical lifting slide 21 and stand unit 2 makes the range of the vertical movement of the vertical lifting slide 21 double as that when the abutment position of the abuttable portion 221 is a single portion such as shown in FIGS. 1-3.

The biasing means 23 is provided on the vertical lifting slide 21 (opposite to the cam portion 22), so that it suitably abuts the top face of the outer shell portion 25. The biasing means 23 serves to prevent the collision between the vertical lifting slide 21 and the outer shell portion 25 when the display unit 1 is abruptly lifted. The vibration sound which is caused by the vibration between the cam portion 22 and the vertical lifting slide 21, the outer shell portion 25 can be reduced by the suitable spring biasing force of the biasing means 23.

In FIGS. 5A, 5B, 6A and 6B, a convex guide portion 222 formed on the outer periphery of the cam portion 22 engages with a concave guide slot 211 in the vertical lifting slide 21 similarly to the foregoing first embodiment 1 and also engages with a concave guide recess 26 of the stand unit 2 to stabilize the rotation of the cam portion 22. The turning range of the cam 22 can be restricted by the fact that the engagement piece 224 on the outer periphery of the cam 22 abuts a rotation restriction step portion 27 which is provided in the concave guide recess 26 of the stand unit 2.

The stand unit 2 is provided with translational motion means (vertical lifting slide 21, cam portion 22, biasing means 23) in the flat panel display apparatus of the present embodiment similarly to the first embodiment. This makes it possible to adjust the elevational position of the horizontal rotary pin 3 depending upon the rotation of the display unit 1 without adding any special design to the display unit 1. The display unit 1 can be turned so that it is not in contact with the floor on which the apparatus is placed and the elevational position of the lower end of the display unit 1 is substantially the same before and after the change of the orientation of the display unit 1.

A transitional operation of the display unit 1 between the landscape and portrait orientation can be conducted in a single step in the flat panel display apparatus of the present embodiment. Since turning of the display unit 1 around the substantial center thereof can be conducted, stable turning of the display unit 1 can be conducted without being influenced adversely by gravity.

Third Embodiment

Figure 7A:
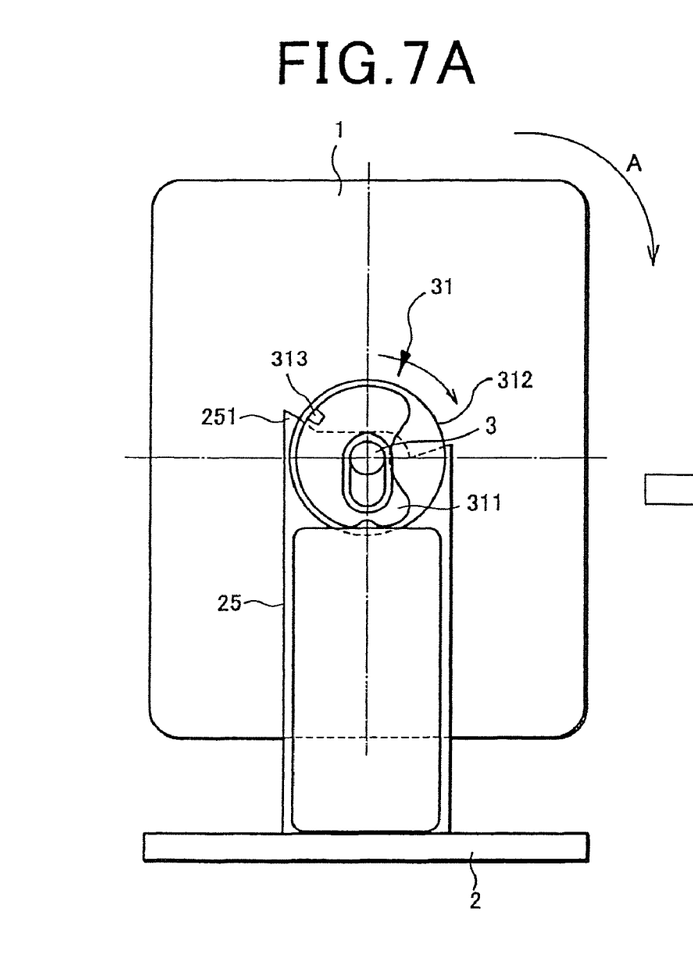
FIGS. 7A and 7B show the third embodiment of the flat panel display apparatus of the present invention and are rear sectional views showing the portrait and landscape screen orientation, respectively.
Figure 7B:
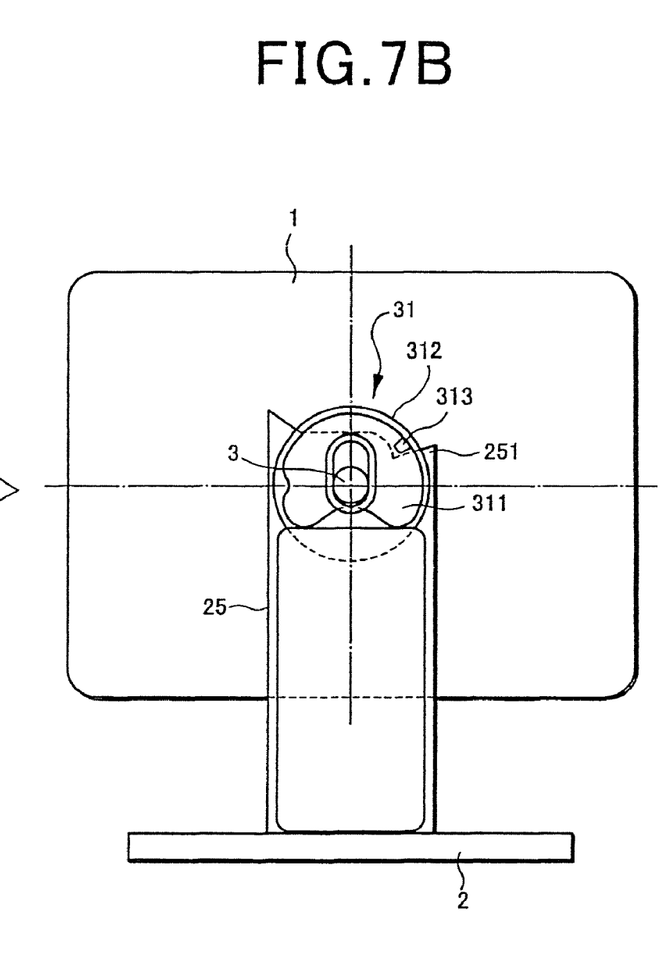
Figure 8A:
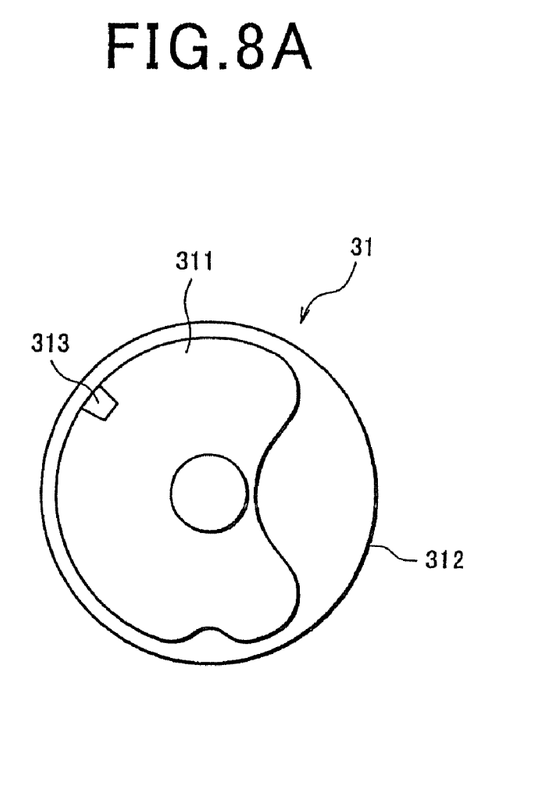
FIGS. 8A and 8B show the cam portion of the third embodiment of the present invention and are front and elevational views, respectively.
Figure 8B:
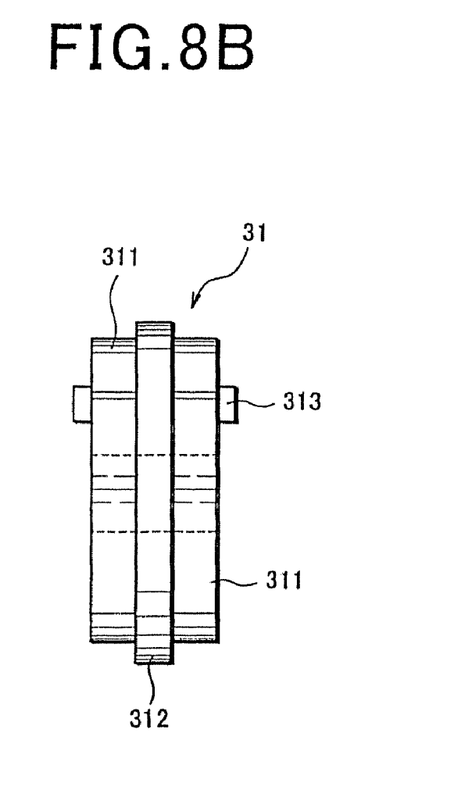
Figure 9A:
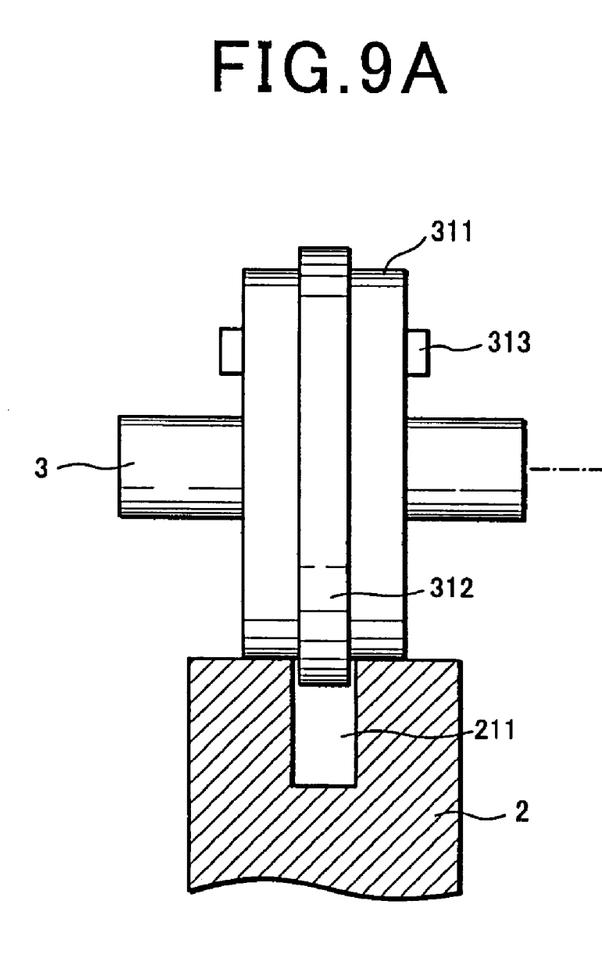
FIGS. 9A and 9B show the main part of the third embodiment of the present invention and are main part elevational sectional views showing the portrait and landscape screen orientation, respectively.
Figure 9B:
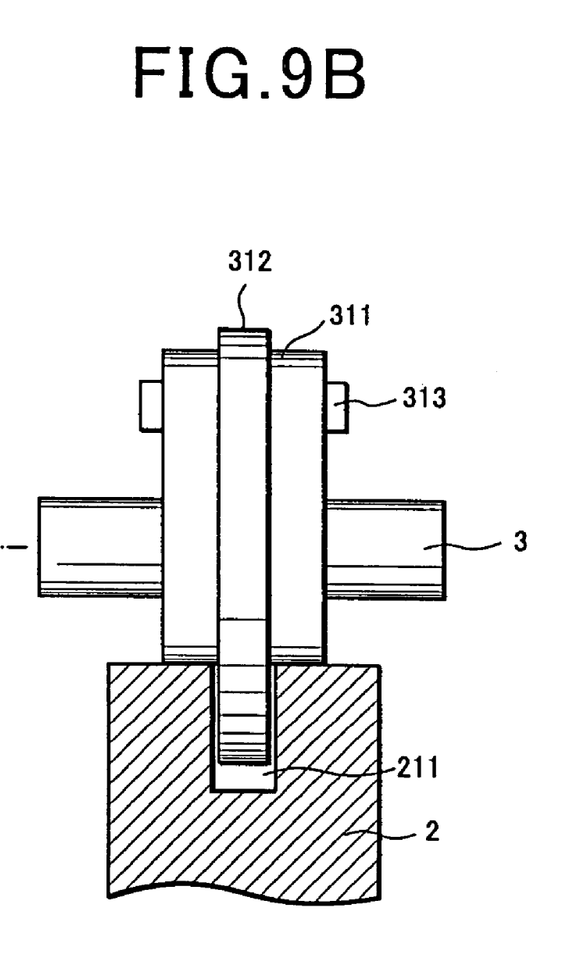

Now, a third embodiment of a flat panel display apparatus of the present invention will be described in detail with reference to FIGS. 7A through 9B. Components which are identical to those in the first embodiment are represented by identical reference numerals. Description thereof will be omitted. FIGS. 7A and 7B show the third embodiment of the flat panel display apparatus of the present invention and are rear sectional views showing the portrait and landscape orientation of the display unit, respectively. FIGS. 8A and 8B are front and elevational views, respectively, showing a cam portion in the flat panel display apparatus of the present embodiment. FIGS. 9A and 9B show a main part of the flat panel display apparatus of the present embodiment and are elevational sectional views showing the portrait and landscape orientation of the display unit, respectively.

The flat panel display apparatus of the present embodiment of FIGS. 7A and 7B is substantially identical with those of the first and second embodiments except that a cam portion 31 is provided on a horizontal rotary pin 3 as translational motion means and rotation of the display unit 1 causes the horizontal rotary pin 3 which is secured to the center of the rear face of the display unit 1 and the cam portion to be rotated.

As shown in FIGS. 8A, 8B, 9A and 9B, the cam portion 31 is provided with an abuttable portion 311 which abuts the upper end of the stand unit 2, a convex outer peripheral portion 312 on the outer periphery thereof, and an engagement piece 313 which engages with the stand unit 2 for restricting the range of the angular rotation of the cam portion 31. The abuttable portion 311 always abuts the stand unit 2 so that the elevational position in which the abuttable portion 311 abuts the stand unit 2 changes depending upon the rotational angle of the cam portion 31. The rotation of the display unit 1 causes the horizontal rotary pin 3 and the cam portion 31 to be rotated, so that the horizontal rotary pin 3 is moved in a vertical direction depending upon the cam contour of the abuttable portion 311 of the cam portion 31. The horizontal rotary pin 3 is mounted on the outer shell 25 in such a manner that the horizontal rotary pin 3 is vertically movable The convex outer peripheral portion 312 of the cam portion 31 is engaged with a concave guide slot 211 of the stand unit to prevent the rotary pin from being laterally shifted on rotation thereof. The engagement piece 313 of the cam portion 31 stops the rotational moment of the cam portion 31 in the position where it abuts the rotation restriction portion 251 provided on the outer shell 25 of the stand 2 for preventing excessive rotation of the cam portion 31.

The flat panel display apparatus of the present embodiment is configured, such that the horizontal rotary pin 3 is provided in the cam portion 31 as described above. This makes it possible to move the horizontal rotary pin 3 in a vertical direction in an interlocking manner with the rotation of the display unit 1 without adding any special design to the display unit 1 and it is possible to adjust the elevational position of the display unit 1 depending upon its rotation angle. The display unit 1 can be turned so that it is not in contact with the floor on which the apparatus is placed and the elevational position of the lower end of the display unit 1 is substantially the same before and after the change of orientation of the display unit 1.

A transitional operation of the display unit 1 between the landscape and portrait orientation can be conducted in a single step in the flat panel display apparatus of the present embodiment. Since turning of the display unit 1 around the substantial center thereof can be conducted, stable turning of the display unit 1 can be conducted without being adversely influenced by gravity. The structure of this third embodiment is simpler than those of the fore-going first and second embodiments and reduction in cost can be achieved.

Fourth Embodiment

Figure 10A:
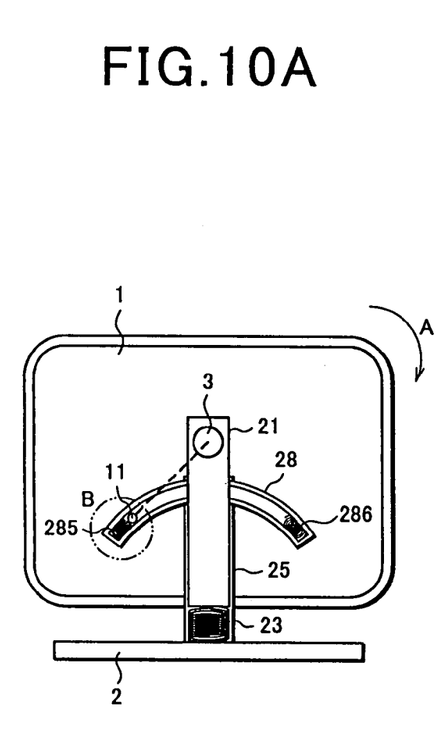
FIGS. 10A, 10B and 10C show the fourth embodiment of the flat panel display apparatus of the present invention and are rear sectional views showing the landscape screen orientation, the transitional orientation and the portrait screen orientation, respectively.
Figure 10B:
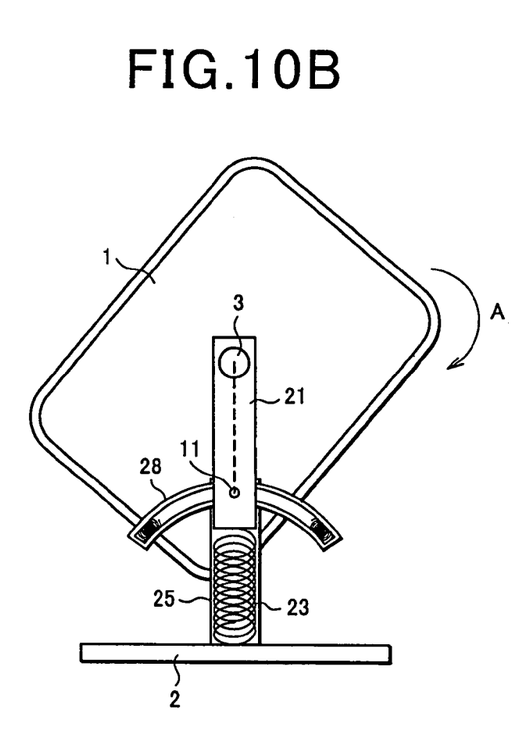
Figure 10C:
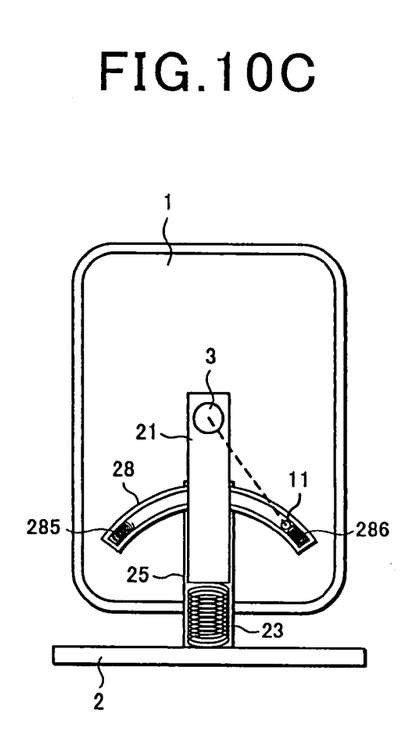
Figure 11:
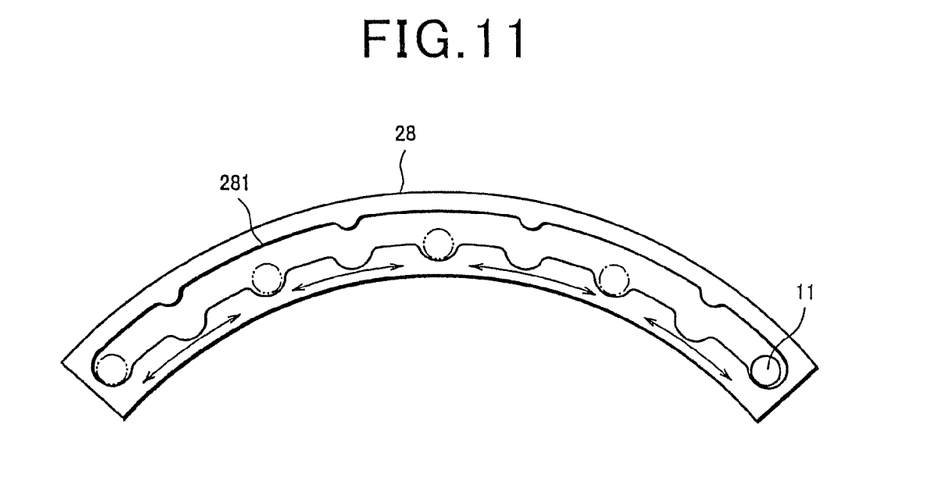
FIG. 11 is a front sectional view showing a rail in the fourth embodiment of the flat panel display apparatus of the present invention.
Figure 12A:
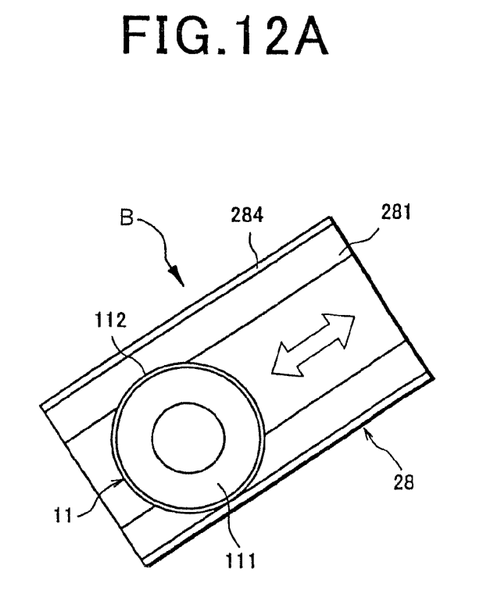
FIGS. 12A and 12B show a part B in FIG. 10A and are a main part front view and a main part elevational sectional view, respectively.
Figure 12B:
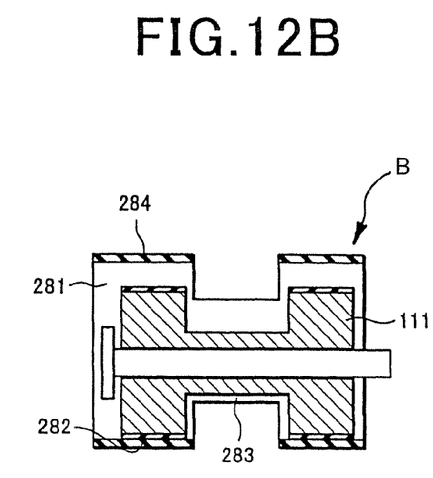

Now, a fourth embodiment of the flat panel display apparatus of the present invention will be described in detail with reference to FIGS. 10A through 12B. Components which are identical with those of the first embodiment will be represented by identical reference numerals. Description thereof will be omitted. FIGS. 10A, 10B and 10C show a fourth embodiment of the flat panel display apparatus of the present invention. FIG. 10A is a rear sectional view showing the landscape orientation of the screen unit. FIG. 10B is a rear sectional view showing the transitional orientation. FIG. 10C is a rear sectional view showing the portrait orientation of the screen unit. FIG. 11 is a front view showing a rail unit in the flat panel display apparatus of the present embodiment. FIGS. 12A and 12B are enlarged views showing a part B in FIG. 10A. FIGS. 12A and 12B are main part front and sectional views, respectively, showing the part B.

As shown in FIGS. 10A through 10C, in the flat panel display apparatus of the present embodiment, the display unit 1 is provided with a projection 11 in an appropriate position as translational motion means and the stand unit 2 is provided with an arcuate rail 28 for guiding the projection 11 when the display unit 1 is rotated and a vertical lifting slide 21 on which a horizontal rotary pin 3 is secured to the center of the rear side of the display unit 1 is rotatably mounted.

For the reason which is similar to those in the above-mentioned first and second embodiments, a biasing means 23 may be provided on or under the vertical lifting slide 21 according to needs. Herein, the biasing means 23 is provided under the vertical lifting slide 21. The vertical lifting slide 21 and the biasing means 23 are accommodated within the outer shell 25 of the stand 2 and the arcuate rail 28 is firmly secured to the outer shell 25.

The principle of the operation of the present embodiment will be described. The vertical lifting slide 21 is moved in a vertical direction by using a force which is applied between the projection 11 and the arcuate rail 28 during the rotation of the display unit 1. The projection 11 is moved on the rail while it abuts the inner periphery 281 of the arcuate rail 28. Conversely, when the display unit 1 is lifted upwardly, the projection 11 abuts the inner periphery 281 of the arcuate rail to apply forces to each other to permit the rotation of the display unit 1. The projection 11 is moved on the arcuate rail while it abuts the inner periphery 281 of the arcuate rail. In order for this mechanism to efficiently function, various structures which will be described are provided.

The arcuate rail 28 has an inner periphery 281 on which the projection 11 abuts. The inner periphery 281 of the rail is preferably in a substantially upwardly convex shape. The reasons are as follows:

Since the center of the rotation is a fixed point which is not movable in lateral and vertical directions in the prior art simple rotation, the trajectory of the projection 11 which is traced by the rotation is a downwardly convex arch when the projection 11 is located in the left and lower position as viewed in the rear view of FIG. 10A. Thus, in the present embodiment, the arcuate rail 28 is formed in the substantially convex shape and the display unit 1 is movable in a vertical direction.

The arcuate rail 28 constrains the trajectory of the projection 11 into a substantially upwardly convex shape. Since the horizontal rotary pin 3 is moved as spaced at a given distance from the projection 11 during this operation, the horizontal rotary pin 3 which is movable only in a vertical direction by the vertical lifting slide 21 traces the trajectory which is moved upwardly to pass through the highest point and is then lowered.

In other words, some positional energy to lift the whole of the display unit is necessary to cause the movement from the orientation of FIG. 10A to that of FIG. 10B or vice versa. Therefore, it is possible to keep the orientation in which unintentional rotational movement is not caused.

The inner periphery 281 of the arcuate rail 28 may be corrugated in shape as shown in FIG. 11. The corrugated shape of the inner periphery of the rail can prevent abrupt movement of the projection 11 and increase the safety of the product during the rotation.

The inner periphery 281 of the rail may be provided on its sectional face with an abuttable portion 282 which is concave in section and abuts the projection 11, and a guide 283 which is concave in section for guiding the movement of the projection 11 as shown in FIGS. 12A and 12B. Alternatively, the projection 11 may be provided with a roller 111 which can be rolled in a moving direction along the arcuate rail 28. Provision of the projection 11 with rolling roller 111 enables the projection 11 to be smoothly moved on the inner periphery 281 of the arcuate rail 28.

The inner periphery 281 of the arcuate rail and the roller 111 may be provided on their outer peripheries with sound absorbing layers 284 and 112, respectively, made of a sound absorbing material such as felt. In this case, wearing of the rail and the projection 11 can be prevented and abutting sound which is generated on rotation of the roller 111 of the projection 11 can be reduced or eliminated.

In the present embodiment, biasing means 285 and 286 such as spring parts and the like are also disposed at the both ends of the arcuate rail 28 in addition to the biasing means 23 which is provided under the vertical lifting slide 21 of the stand unit 2. The biasing means 23 abuts the vertical lifting slide 21 and the biasing means 285 and 286 abut the projection 11 for absorbing the shock due to abrupt movement during the vertical translational motion and the rotation. Alternatively, the biasing means may be provided on the projection 11. If the biasing means 23 are provided on both upper and lower sides of the vertical lifting slide 21, the stability of the motion of the vertical lifting slide 21 can be further enhanced.

Since the distance between the horizontal rotary pin 3 and the projection 11 is made constant by configuring the flat panel display apparatus of the present embodiment so that both the display unit 1 and the stand unit 2 are provided with translational motion means, the projection 11 is moved on the arcuate rail 28 in association with the rotation of the display unit. As a result, the vertical lifting slide 21 is moved in a vertical upward or downward direction, so that the horizontal rotary pin 3 provided on the vertical lifting slide 21 will also be moved in a vertical upward or downward direction.

This makes it possible to adjust the elevational position of the display unit 1 depending upon the rotation of the display unit 1 and the display unit 1 can be turned so that it is not in contact with the floor on which the apparatus is placed and the elevational position of the lower end of the display unit 1 is substantially the same before and after the change of the orientation of the display unit 1.

Although the first to fourth embodiments of the present invention in which the vertical upward or downward translational motion of the display unit 1 caused by the rotation of the display unit 1 is achieved by the mechanisms described, means for interlocking the rotation of the display unit with the translational motion thereof may be implemented by an electronic control using a microcomputer and the like as well as these mechanisms. It is possible to effectively extend the vertical moving range by combination of the above-mentioned embodiments.

Since the flat panel display apparatus of the present invention is formed as mentioned above, a transition of the display screen between the landscape and portrait orientation can be achieved in a single step. Since the horizontal rotary pin is provided on the substantially central portion of the display unit, stable rotation of the display unit can be conducted without being adversely influenced by the rotational moment thereof. Since the display unit is movable in an upward and downward direction, the display unit can be positioned in an optimal elevational position while it is in the portrait or landscape orientation.

The invention claimed is:

1. A flat panel display apparatus, comprising:
a thin flat display unit having a rectangular shape display screen thereon;
a stand unit for supporting said display unit;
a horizontal rotary pin defining a horizontal rotary axis which is secured to said display unit on the center of its rear side and which holds said display unit so that display unit is rotatable by at least 90° relative to said stand unit; and
translational motion means forces the horizontal rotary pin to automatically move in a vertical direction in an interlocking manner as the display unit is rotated about the horizontal rotary axis,
wherein said translational motion means is provided on said horizontal rotary pin, and
wherein said translational motion means comprises a cam portion which abuts said stand unit in such a manner that said horizontal rotary pin is movable in a vertical direction when said cam portion is rotated in an interlocking manner with said horizontal rotary pin.

2. A flat panel display apparatus, comprising:
a thin flat display unit having a rectangular shape display screen thereon;
a stand unit for supporting said display unit;
a horizontal rotary pin defining a horizontal rotary axis which is secured to said display unit on the center of its rear side and which holds said display unit so that display unit is rotatable by at least 90° relative to said stand unit; and
translational motion means forces the horizontal rotary pin to automatically move in a vertical direction in an interlocking manner as the display unit is rotated about the horizontal rotary axis,
wherein said translational motion means is provided on said stand unit.

3. A flat panel display apparatus as defined in claim 2, wherein said translational motion means comprises a vertical lifting mechanism, on which said horizontal rotary pin is rotatably mounted and movable in a vertical upward or downward direction, and
a cam portion which abuts said vertical lifting mechanism and is interlocked with said horizontal rotary pin so that it is rotated in response to rotation of said horizontal rotary pin.

4. A flat panel display apparatus as defined in claim 3, wherein said vertical lifting mechanism is provided with a guide for guiding the rotation of said cam portion.

5. A flat panel display apparatus as defined in claim 3 or 4, wherein said stand unit is provided with a guide for guiding the rotation of said cam portion.

6. A flat panel display apparatus as defined in claim 3 or 4, wherein said stand unit is provided with a rotation restriction portion which abuts a part of said cam portion on said horizontal rotary pin for restricting the range of the rotation of said horizontal rotary pin.

7. A flat panel display apparatus as defined in claim 3 or 4, wherein said stand unit is provided therein with biasing means for biasing said vertical lifting mechanism in a vertical upward or downward direction to apply a load upon the rotation of said display unit.

8. A flat panel display apparatus as defined in claim 1, wherein said stand unit is provided with a guide for guiding the rotation of said cam portion.

9. A flat panel display apparatus as defined in claim 8, wherein said stand unit is provided with a rotation restriction portion which abuts a part of said cam portion on said horizontal rotary pin for restricting the range of the rotation of said horizontal rotary pin.

10. A flat panel display apparatus, comprising:
a thin flat display unit having a rectangular shape display screen thereon;
a stand unit for supporting said display unit;
a horizontal rotary pin defining a horizontal rotary axis which is secured to said display unit on the center of its rear side and which holds said display unit so that display unit is rotatable by at least 90° relative to said stand unit; and
translational motion means forces the horizontal rotary pin to automatically move in a vertical direction in an interlocking manner as the display unit is rotated about the horizontal rotary axis,
wherein said translational motion means is provided on both of said display unit and said stand unit.

11. A flat panel display apparatus as defined in claim 10, wherein said translational motion means comprises
at least one projection linked to said horizontal rotary pin which is provided on the rear side of said display unit and displaceable by rotation of said display unit,
a vertically movable vertical lifting slide on which said horizontal rotary pin is rotatably mounted, and
a rail which is provided on said stand unit for controlling the vertical movement of said vertical lifting slide, said rail engaging and guiding the trajectory of said projection which is displaced by the rotation of said display unit.

12. A flat panel display apparatus as defined in claim 11, wherein said rail has substantially rectilinear shape or upwardly convex shape.

13. A flat panel display apparatus as defined in claim 11 or 12, wherein said rail is provided on its inner periphery with a corrugated portion which is engaged in said projection.

14. A flat panel display apparatus as defined in claim 11 or 12, wherein said projection comprises a roller which can be rolled on and along the inner face of said rail while said roller abuts thereon.

15. A flat panel display apparatus as defined in claim 11 or 12, wherein a concave or convex configuration for preventing said projection from escaping from said rail is provided on the inner periphery of said rail or the outer periphery of said projection.

16. A flat panel display apparatus as defined in claim 11 or 12, wherein a fabric material for suppressing the wearing of said rail and said projection is applied on the inner periphery of said rail or outer periphery of said projection.

17. A flat panel display apparatus as defined in claim 11 or 12, wherein said stand unit is provided with biasing means for preventing said vertical lifting slide from abruptly moving in a vertical direction.

18. A flat panel display apparatus as defined in claim 11 or 12, wherein said rail or said projection is provided with biasing means for mitigating due to abrupt displacement of said projection.

19. A flat panel display apparatus as defined in claim 5, wherein said stand unit is provided with a rotation restriction portion which abuts a part of said cam portion on said horizontal rotary pin for restricting the range of the rotation of said horizontal rotary pin.

20. A flat panel display apparatus as defined in claim 5, wherein said stand unit is provided therein with biasing means for biasing said vertical lifting mechanism in a vertical upward or downward direction to apply a load upon the rotation of said display unit.

21. A flat panel display apparatus as defined in claim 6, wherein said stand unit is provided therein with biasing means for biasing said vertical lifting mechanism in a vertical upward or downward direction to apply a load upon the rotation of said display unit.

22. A flat panel display apparatus as defined in claim 13, wherein said projection comprises a roller which can be rolled on and along the inner face of said rail while said roller abuts thereon.

23. A flat panel display apparatus as defined in claim 13, wherein a concave or convex configuration for preventing said projection from escaping from said rail is provided on the inner periphery of said rail or the outer periphery of said projection.

24. A flat panel display apparatus as defined in claim 14, wherein a concave or convex configuration for preventing said projection from escaping from said rail is provided on the inner periphery of said rail or the outer periphery of said projection.

25. A flat panel display apparatus as defined in claim 13, wherein a fabric material for suppressing the wearing of said rail and said projection is applied on the inner periphery of said rail or outer periphery of said projection.

26. A flat panel display apparatus as defined in claim 14, wherein a fabric material for suppressing the wearing of said rail and said projection is applied on the inner periphery of said rail or outer periphery of said projection.

27. A flat panel display apparatus as defined in claim 15, wherein a fabric material for suppressing the wearing of said rail and said projection is applied on the inner periphery of said rail or outer periphery of said projection.

28. A flat panel display apparatus as defined in claim 13, wherein said stand unit is provided with biasing means for preventing said vertical lifting slide from abruptly moving in a vertical direction.

29. A flat panel display apparatus as defined in claim 14, wherein said stand unit is provided with biasing means for preventing said vertical lifting slide from abruptly moving in a vertical direction.

30. A flat panel display apparatus as defined in claim 15, wherein said stand unit is provided with biasing means for preventing said vertical lifting slide from abruptly moving in a vertical direction.

31. A flat panel display apparatus as defined in claim 16, wherein said stand unit is provided with biasing means for preventing said vertical lifting slide from abruptly moving in a vertical direction.

32. A flat panel display apparatus as defined in claim 13, wherein said rail or said projection is provided with biasing means for mitigating the shock due to abrupt displacement of said projection.

33. A flat panel display apparatus as defined in claim 14, wherein said rail or said projection is provided with biasing means for mitigating the shock due to abrupt displacement of said projection.

34. A flat panel display apparatus as defined in claim 15, wherein said rail or said projection is provided with biasing means for mitigating the shock due to abrupt displacement of said projection.

35. A flat panel display apparatus as defined in claim 16, wherein said rail or said projection is provided with biasing means for mitigating the shock due to abrupt displacement of said projection.

36. A flat panel display apparatus as defined in claim 17, wherein said rail or said projection is provided with biasing means for mitigating the shock due to abrupt displacement of said projection.

* * * * *